United States Patent
Jones

[15] 3,685,083
[45] Aug. 22, 1972

[54] BI-DIRECTIONAL PIPELINE PIG
[72] Inventor: John Walter Jones, Hayes, England
[73] Assignee: General Descaling Company Limited, Worksop, England
[22] Filed: Dec. 21, 1970
[21] Appl. No.: 100,278

[30] Foreign Application Priority Data
Jan. 1, 1970 Great Britain..................27/70

[52] U.S. Cl............................................15/104.06 R
[51] Int. Cl..................................................B08b 9/04
[58] Field of Search......15/3.5, 3.51, 3.52, 104.06 R, 15/104.06 A, 104.06 B, 104.16, 104.19; 166/191

[56] References Cited
FOREIGN PATENTS OR APPLICATIONS
117,559  2/1959  U.S.S.R...............15/104.06 R Primary Examiner—Edward L. Roberts
Attorney—Baldwin, Wight & Brown

[57] ABSTRACT

A bi-directional pig for operation in a pipeline comprising an elongated body, at least one annular sealing assembly mounted on said body, the sealing assembly comprising a plurality of alternately hard and soft sealing rings sandwiched between rigid backing members and means for applying pressure to said assembly whereby in operation, the soft sealing rings project outwardly to enter into sealing engagement with the wall of the pipe. Locking means are preferably incorporated in the bi-directional pig for automatically interlocking the same to another pig when in the pipeline and for releasing the same therefrom.

11 Claims, 5 Drawing Figures

BI-DIRECTIONAL PIPELINE PIG

Pigs, or scrapers as they are sometimes called, are used in pipeline testing operations for two purposes (a) for filling lines with water and (b) for dewatering the pipeline after the hydraulic test has been completed.

Known pigs are basically a series of moulded synthetic rubber cups attached to a circular metal body and are in effect pistons. As the cups are slightly larger in diameter than the internal diameter of the pipe the entire unit fits tightly inside thereby creating a seal.

In the case of (a), when filling a pipeline with water, the water under pressure forces the pig along the pipe sweeping the air ahead of it, where it is exhausted at the far end of the pipeline through a suitable valve or opening in the pipe. Then the pipeline is completely filled with water for its entire length and all the air is expelled.

In the case of (b), after the hydraulic pressure test has been completed, it is necessary to expel the volume of water from the pipeline and this is carried out by driving another pig through the pipe pushing the water ahead of it, the source of energy for this operation being the injection of compressed air. Thus a minimum of two pigs is required to be placed in the pipeline to complete the sequence of operations. Due to new highly exacting regulations that are now in force for the high pressure testing of pipelines the running of pigs has become very complicated for the following reasons:

Pipelines can now only be tested in lengths not exceeding seven miles, so that a pipeline 28 miles long will require to be tested in four sections each of 7 miles in length. There is however another important consideration because the hydraulic gradient of any section must not exceed 200 feet head. Thus, dependent upon contour, many more sections may be necessary in the 28 mile length before the full test can be completed.

Invariably the water used for the test has to be returned to the source from which it was drawn. This presents the greatest complication with regard to the running of pigs as existing cup pigs can only travel in one direction and they cannot be sent back in the reverse direction to carry out the dewatering operation, without the end of the pipe being cut off, the pigs taken out, turned round and the end welded back on to the pipe again.

Since pigs of hitherto known design will not perform in both directions, the alternative has been to use spheres which will travel in either direction. There are however many disadvantages to these. These spheres which are constructed of heavy neoprene with thick walls and have a hollow center, having been inserted into the pipe, are filled with water pressurized up to approximately 100 p.s.i. to expand the diameter of the ball until it fits tightly into the pipe. It will be understood that only a relatively small area of the sphere's surface is in contact with the pipe wall at any given point. Should spheres deflate in use and become slack, there is a tendency to roll and once contact with the pipe wall is lost there is an immediate by-pass of air or water and the sphere will remain stationary. Spheres also tend to wear flat and go completely out of round; once this happens they are useless.

In accordance with the present invention a bi-directional pipeline pig comprises an elongated body with at least one annular sealing assembly mounted thereon, the sealing assembly comprising a plurality of alternately hard and soft sealing rings sandwiched between rigid backing members.

Preferably there are two such sealing assemblies which are separated from each other along the body axis and each assembly having a first backing member secured to the body, and a second backing member which is nearer the end of the body and slidably adjustable thereon.

Alternatively an annular sealing assembly would have rigid backing members which are slidable along the body part, and whose movement is restricted by stops on the body part such that in operation in which ever direction the pig is moved through a pipe, the soft sealing rings will be caused to expand and make tight sealing contact with the wall of the pipe.

It will be appreciated that the pig construction of this invention will operate in both directions dependent upon the direction of flow of water through the pipe since the pressure exerted thereby on the movable member will displace it bodily in relation to the fixed member and thus bring about expansion of the soft sealing rings and force them into tighter engagement with the wall of the pipe. A further advantage is that the sealing rings when worn can readily be replaced.

Two particular and at present preferred forms of bi-directional pipelines pigs in accordance with the invention are illustrated by way of example in the accompanying drawings in which.

Figure 1:
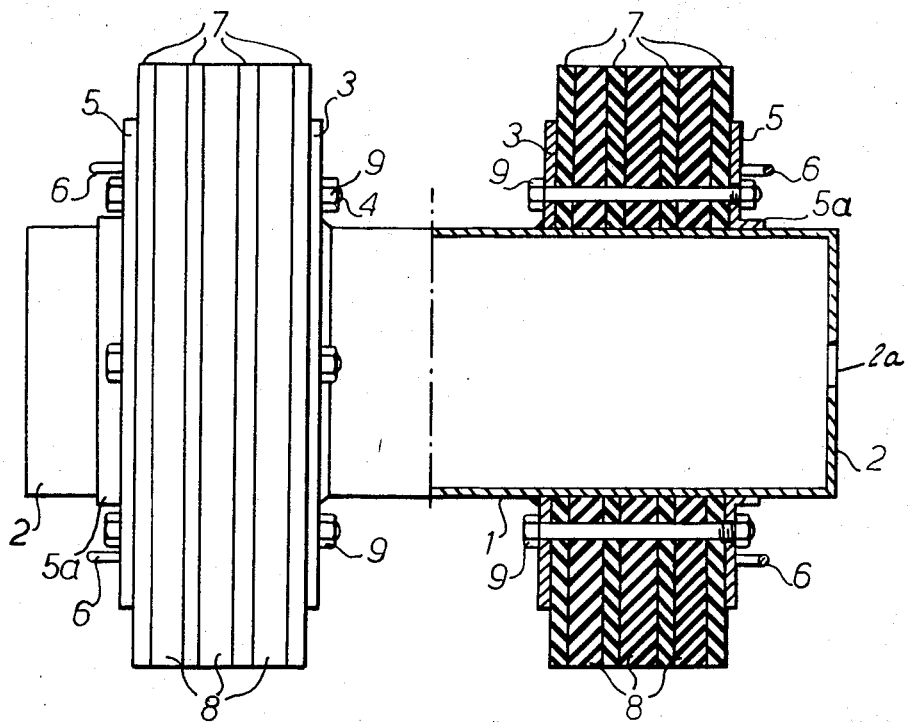
FIG. 1 is a half elevation, half sectional view of the pig.
Figure 2:
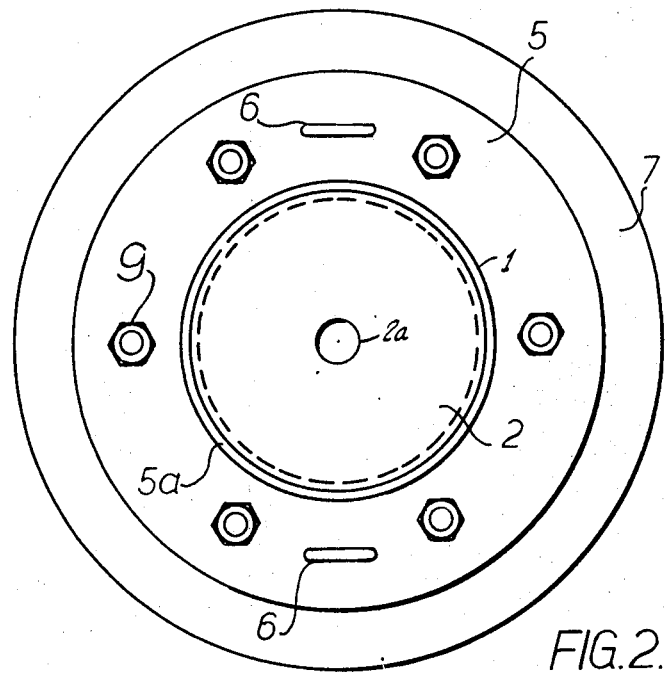
FIG. 2 is a right end elevational view of the pig shown in FIG. 1.
Figure 3:
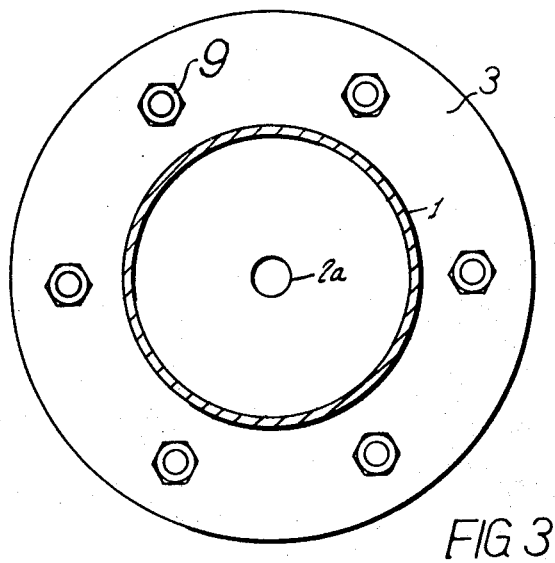
FIG. 3 is an end elevation of a welded flange plate.

Referring firstly to FIGS. 1 to 3, the main body of the pig consists of a hollow cylindrical steel body or casing 1, the length of which is slightly greater than the diameter of the pipe in which it is to be used. The ends of the cylinder are partly closed by a circular plate 2 welded one at each end and in which are central apertures 2a. To this casing are welded two steel plate ring flanges 3 thus dividing the casing into three sections. These flanges have spacing corresponding to approximately a third of the length of the casing and the flanges 3 are drilled to take a series of bolts 4. Two similar flanges 5, each with a 1½ inch upstand 5a on one side are slidable over the pig casing at each end. These are also drilled to take bolts, and each of them has one or more steel loops 6 welded on its outward side for the purpose of extracting the pig from the pipe.

A series of synthetic rubber discs 7, 8 each with a center hole of the same diameter as the casing 1 are then placed over it and pushed along to the welded flange 3. These discs 7, 8 are drilled with a series of bolt holes to match the holes in the flanges. The number and arrangement of the discs, alternatively hard (7) and soft (8), is dependent on the size of the unit required and the duty it is to perform. When the discs have been assembled on to the casing at each end the sliding flanges 5 are then added, the bolt holes lined up, and the entire pack of rubber secured with the through bolts 4 and tightened up with nuts 9 located on the center side of the inner welded flanges.

The pig operates in the following manner:

It is inserted into the pipe which it fits tightly, the end of the pipe is then sealed with a welding cap and water is supplied through a valve behind the pig. As pressure builds up so the rubber discs 7, 8, are squeezed tighter together, the hard rubber pressing on the soft rubber, resulting in the soft rubber increasing slightly in diameter thus creating a permanent seal against the pipe wall, the greater the pressure the tighter the seal. There is therefore practically no by-pass of air or water over the pack of rubber discs. The sliding flange plates 5 at each end ensure an even distribution of load over the area of the rubber discs 7, 8. As the pig is constructed similarly at both ends, when it reaches the end of its travel through the pipeline, having filled it with water, air pressure can be applied to return it to the end of the pipe from which it was launched, thus dewatering the section.

The pigs can be manufactured in sizes from 3 inches to 48 inches in diameter and are all constructed on the same principle for each size. Only in the smaller range, i.e. from 3 inches to 8 inches is there any variation in design and for these sizes the hollow body or casing is replaced by a solid bar.

Figure 4:
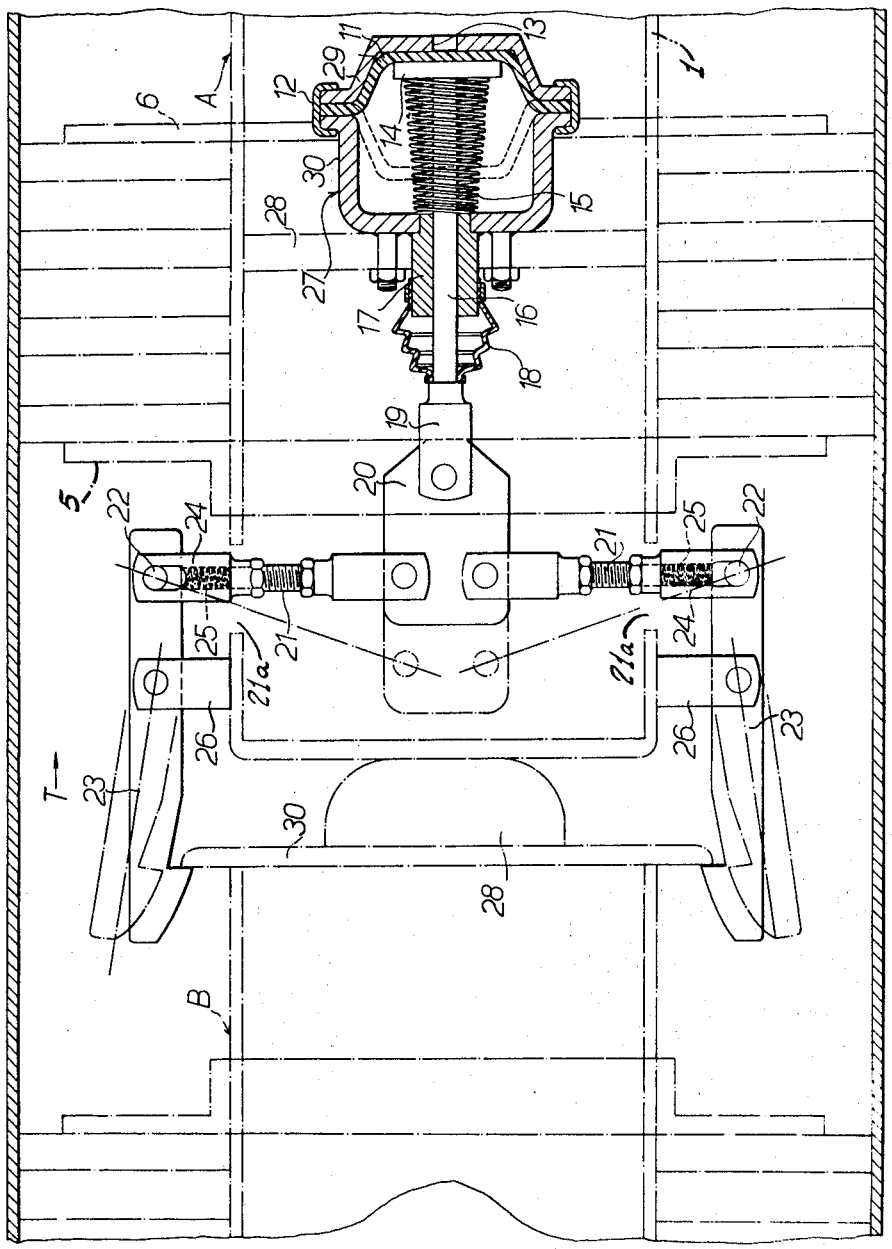
FIG. 4 shows a pipeline pig generally in accordance with FIGS. 1 to 3 and equipped with a locking device; whilst

FIG. 4 illustrates a pipeline pig as above specifically described but which is equipped with a device by which the pig can be automatically locked to and released from an adjacent suitably adapted pig in a pipeline.

As shown in FIG. 4, the locking and release device shown mounted within the casing of the pig A comprises a pressure chamber 27 secured by studs and nuts to a supporting plate 28 welded to the inside of the pig casing. This chamber 27 is bowl shaped and formed into two sections 29, 30. Between the sections there is clamped a neoprene diaphragm 11 the whole assembly being secured and sealed by a circular steel clip 12. The section 29 of the chamber has a central pressure access port 13. The pressure chamber 27 contains the head 14 of a piston which is urged against the diaphragm 11 by a coil spring 15 which surrounds the piston rod 16. The latter is slidably supported in a guide 17 which is welded to the support plate 28. The guide 17 is sealed to the piston rod 16 by a flexible gaiter 18.

The outward end of the piston rod 16 terminates in a clevis 19 which is pivotally coupled to a crosshead 20 which pivotally supports a pair of radial link arms 21 which are adjustable for length openings 21a being provided in the wall of the casing 1 through which the link arms 21 extend. At their outward ends these link arms 21 have slotted clevis connections 24 by which they are coupled to securing pins 22 fixed to the ends of a pair of latching arms 23. The clevis connections 24 each house a plunger spring 25. The latch arms 23 are pivotally supported between trunnion brackets 26 fixed to the pig casing and their free ends projecting beyond the rear end of the pig are releasably engageable with the chamfered rim of an anchor plate 30 which is provided on the front end of the identical and adjacent pig B. This anchor plate carries a central rubber buffer 28.

When adjacent pigs A and B are locked together, the latch arms 23, the link arms 21 and the crosshead 20 are all in the positions indicated by the full lines and the piston head 14, under the pressure of the spring 15, forces the diaphragm 11 against the end of the chamber section 29.

When however a significant air or water pressure develops within the casing of the pig 2, fluid passing through the port 13 moves the diaphragm 11 towards the position indicated by the chain-dashed lines. Thereby the piston is moved so that the crosshead assures the chain-dashed line position. This causes angular movement of the latch arms 23 to the position shown in dashed lines thereby releasing the first pig from the second one.

The direction of intended travel of the pigs is indicated by arrow T in FIG. 4.

Figure 5:
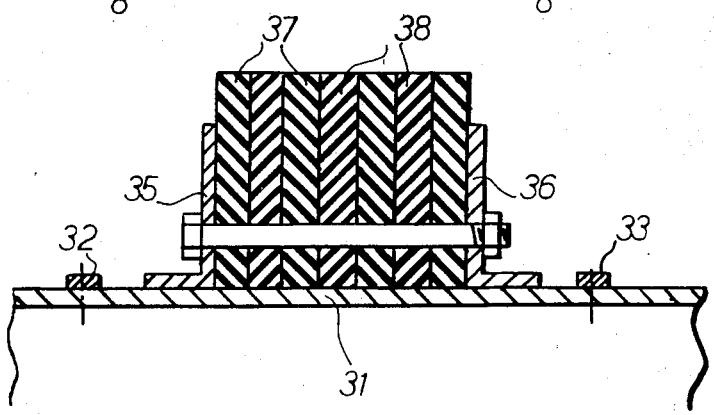
FIG. 5 is a fragmentary sectional view of a modified form of bi-directional pipeline pig.

Referring to FIG. 5, the pipeline pig has a single sealing assembly comprised of a plurality of alternately hard and soft synthetic rubber annular discs 37, 38 sandwiched between a pair of flanged backing plates 35, 36, each slidably mounted on the cylindrical casing 31 of the pig.

Displacement of the sealing assembly along the casing 31 is restricted by stop collars 32, 33 fixed e.g. by screwing to the casing and engageable respectively by the flanged backing plates 35, 36.

In operation, when this pig is moved along a pipe line, in the direction of either end, by the application thereto of fluid under pressure the sealing assembly moves to the limit of the appropriate stop whereupon the continued application of pressure compresses the discs 37, 38 together so that they seal more tightly against the pipeline wall.

This form of pig could also be equipped with automatic locking and release means if required.

In the event of wear of the sealing rings it is a simple matter to replace them by detaching the collars 32, 33. In the arrangement shown in FIG. 1 it is sufficient to undo the bolts 4 having released the bolts 4.

What is claimed is:

1. A bi-directional pig for operation in a pipeline comprising an elongated body, two annular sealing assemblies mounted on said body and spaced apart from one another, each sealing assembly including alternately relatively hard and soft sealing rings sandwiched between backing members, one of which is fast on the body and the other slidably mounted thereon and whereby, in operation, in whichever direction the pig is moved along the pipeline, the slidable backing member of one assembly will be displaced to apply pressure to the sealing discs and cause the soft discs to project outwardly.

2. A bi-directional pig for operation in a pipeline comprising an elongated body, two annular sealing assemblies mounted on said body and spaced apart from one another, each sealing assembly including alternately relatively hard and soft sealing rings sandwiched between backing members, each assembly having a first member fast on the body and a second member slidable thereon and located adjacent an end of the body whereby, in operation, in whichever direction the pig is moved along the pipeline, the slidable member of the rearmost assembly will be displaced to apply pressure to the discs and cause the soft discs to project outwardly.

3. A bi-directional pig as claimed in claim 2 in which the backing members consist of flanged plates and means is provided for drawing a backing member which is slidable towards the backing member which is fixed so as to pre-compress the sealing rings therebetween.

4. A bi-directional pig as claimed in claim 3 wherein the drawing means comprises bolts passing through each sealing assembly.

5. A bi-directional pig as claimed in claim 3 in which the elongated body is hollow and contains pneumatically operated means for causing adjacent pigs to be locked to or released from each other.

6. A bi-directional pig as claimed in claim 2 and including an automatic locking and release device comprising a pressure chamber with a fluid pressure access opening, a piston having its head situated within the pressure chamber and a rod pivotally linked to latching arms which are movable into and out of latching engagement with an adjacent pipeline pig, movement of said piston as a result of a particular fluid pressure increase in the chamber causing movement of said latching arms to release said adjacent pipeline pig.

7. A bi-directional pig as claimed in claim 6 in which the pressure chamber and the piston are located within a central cylindrical casing of the pig while the latching arms are pivotally mounted outside that casing and project rearwardly thereof.

8. A bi-directional pig as claimed in claim 7 in which the pressure chamber is divided by a diaphragm which faces the access opening and is engaged by the piston head.

9. A bi-directional pig as claimed in claim 8 in which the piston rod is coupled to a crosshead which is itself coupled to the latching arms by radial links.

10. A bi-directional pig as claimed in claim 9 in which the radial links are of adjustable length and have slotted outward ends by which they are connected through pins to the latching arms.

11. A bi-directional pipeline pig as claimed in claim 10 in which slidably adjustable backing members have loops attached thereto for extracting the pig from a pipe.

* * * * *